United States Patent

[11] 3,568,722

[72] Inventors William L. Runshe;
Clarence H. Helbing, Shelbyville, Ind.
[21] Appl. No. 760,171
[22] Filed Sept. 17, 1968
[45] Patented Mar. 9, 1971
[73] Assignee PPG Industries, Inc.
Pittsburgh, Pa.

[54] LONGITUDINALLY REINFORCED FLEXIBLE DUCT
10 Claims, 3 Drawing Figs.
[52] U.S. Cl........................................................ 138/133,
138/109, 138/174
[51] Int. Cl........................................................ F16l 11/02
[50] Field of Search............................................ 138/133
(Glass Fiber Digest), 144, 141, 174, 153, 178,
172, 119, 140, 155, 177

[56] References Cited
UNITED STATES PATENTS
2,722,237  11/1955  Rosel............................ 138/174

| 2,858,854 | 11/1958 | Daggett | 138/131X |
|---|---|---|---|
| 2,884,010 | 4/1959 | Fischer | 138/178UX |
| 3,002,534 | 10/1961 | Noland | 138/174X |
| 3,066,358 | 12/1962 | Schiess | 138/178UX |
| 3,085,919 | 4/1963 | Clark | 138/174 |
| 3,216,459 | 11/1965 | Schroeder et al. | 138/139 |
| 3,394,737 | 7/1968 | Hoffman et al. | 138/109 |

FOREIGN PATENTS

| 447,816 | 5/1936 | Great Britain | 138/174 |
|---|---|---|---|
| 323,096 | 8/1957 | Switzerland | 138/174 |

*Primary Examiner*—Laverne D. Geiger
*Assistant Examiner*—Henry K. Artis
*Attorney*—Chisholm and Spencer ABSTRACT: A flexible insulated duct comprising a wire helix wrapped with insulating material, encased in a fluid-impermeable sleeve and terminated with longitudinally reinforced connector members. The longitudinal reinforcement consists of cordlike tension means affixed to the connector members to enhance the axial tensile strength of the duct while maintaining its flexibility, i.e., its bendability and twistability.

PATENTED MAR 9 1971

3,568,722

INVENTORS
WILLIAM L. RUNSHE
CLARENCE H. HELBING

Clarkson and Spencer
ATTORNEYS

LONGITUDINALLY REINFORCED FLEXIBLE DUCT

BACKGROUND OF THE INVENTION

This invention relates to a flexible insulated duct for the conduction of gaseous fluids. More specifically, the present invention relates to a flexible insulated duct comprised of a helically wound wire wrapped with porous insulating material, encased in a flexible fluid-impermeable sleeve and terminated with longitudinally reinforced sheet metal connectors.

In copending application Ser. No. 701,301 entitled "Flexible Duct," filed Jan. 29 1968 by Malcolm Hay, Jr., now U.S. Pat. No. 3,502,114 there is disclosed a type of insulated flexible duct, together with its method and apparatus of manufacture. The manufacture of the duct therein disclosed proceeds with the formation of a dimensionally unstable wire helix about a collapsible mandrel while contemporaneously securing the ends of the wire helix to a pair of sheet metal connectors. A blanket of porous insulating material material is thereafter wrapped about the wire helix and sheet metal connectors. The insulating material preferred consists of a composite blanket of individual glass fibers and glass fiber strands bonded together by a suitable resinous binder such as phenol formaldehyde. The blanket of insulating material is adhered to the wire helix and sheet metal connectors by an adhesive, preferably a nonflammable adhesive that remains flexible after setting. The adhesive serves to unite the insulating material, the wire helix and the sheet metal connectors so as to maintain the spacing of the convolutions of the wire helix and to secure the connector members to the insulating material. The insulating material and its subjacent supporting structure are then encased by a flexible fluid-impermeable sleeve to provide a finished duct section.

As will be apparent, the axial tensile strength of a duct of the type described depends upon maintaining the integrity of its component parts, and in particular upon maintaining the integrity of its blanket of insulating material. In other words, in the construction described, the blanket of insulating material provides the principal longitudinal strength of the duct while the wire helix and connectors provide the principal radial or collapse strength of the duct. However, the strand-fiber composite insulating material that forms this blanket characteristically exhibits a tensile strength of only about 10 pounds per square inch in the longitudinal direction and only about 7 pounds per square inch in the transverse direction of the blanket formation. Accordingly, it has been found desirable to provide means to enhance or improve the axial tensile strength of such flexible insulated ducts while substantially fully maintaining the flexibility of the duct, i.e., its bendability and twistability.

One means for improving the axial tensile strength of flexible insulated duct involves the use of an intermediate layer of fiber glass fabric or scrim cloth that circumscribes the wire helix and portions of the connector members and is adhered thereto and to the outer layer or wrapping of insulating material by a suitable adhesive. However, this type of construction has been found to be expensive by reason of the additional materials costs involved in the use of the fiber glass fabric or scrim cloth. Moreover, the use of fiber glass fabric or scrim cloth has been found to produce characteristically higher friction losses, thereby reducing the operating efficiency of duct systems employing this construction.

In addition to the foregoing, it has been found that duct produced with the above-described scrim cloth construction inherently exhibits less flexibility, i.e., bendability and twistability. The flexibility characteristic of insulated duct of the type described is highly important, because it is this characteristic that enables ready installation of the ductwork around corners and in restricted areas such as in the floors, walls or ceilings of a building. As will be apparent, it is also this characteristic that can significantly influence or determine the amount of torsional stress, if any, that is present at a joint between adjacent sections of duct and/or the amount of residual stress that is present in a bent section of duct, tending to separate adjacent duct sections. Such considerations are important since, as the resistance to bendability and twistability increases, the cost of duct installation increases. Moreover, due to the action of the latent stresses, mentioned above, tending to separate adjacent duct sections, there exists a greater potential for leakage at duct joints.

The present invention is directed towards ameliorating or substantially eliminating the foregoing problems. In particular, the present invention provides a flexible insulated duct having longitudinally reinforced sheet metal connectors. The longitudinal reinforcement consists of flexible cordlike tension means affixed to the connector members to enhance the axial tensile strength of the duct while maintaining its flexibility, i.e., its bendability and twistability.

The foregoing and other objects, features and advantages of this invention will become more apparent when considered in connection with the accompanying drawings, in which.

Figure 1:
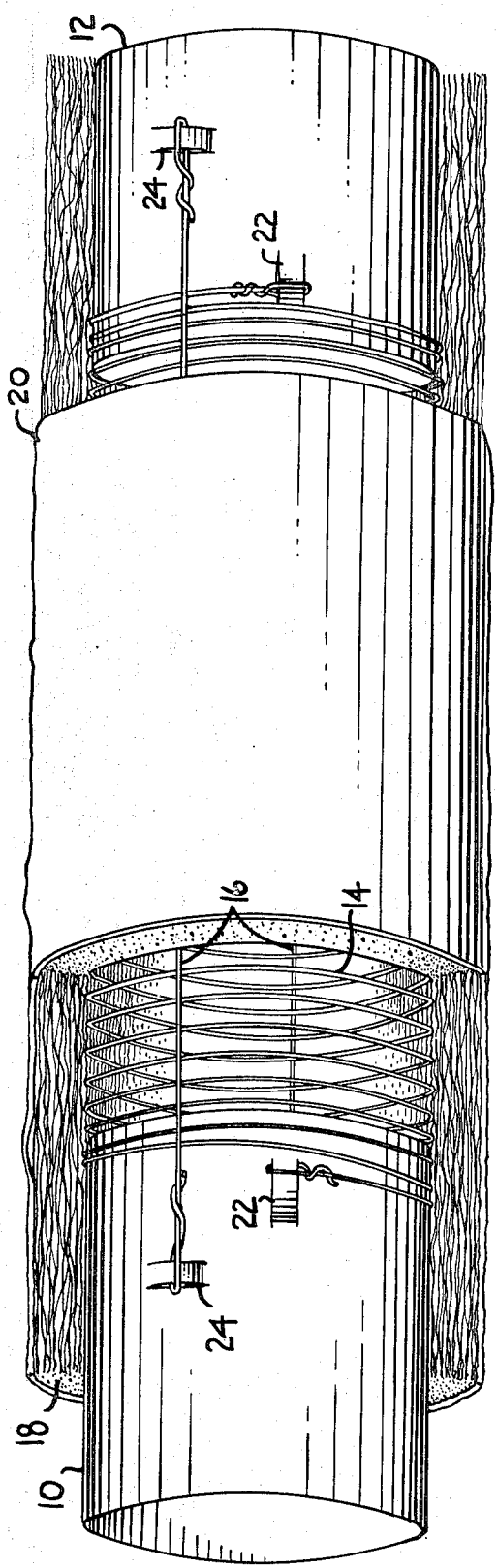
FIG. 1 is a pictorial view, partly broken away, of a short section of flexible insulated duct of this invention.

As shown in FIG. 1, the duct of this invention is composed of a male and a female connector member 10 and 12, a wire helix 14, longitudinal reinforcement 16, a blanket of insulating material 18 and a flexible outer sleeve 20.

In the manufacture of the duct of this invention, the pair of connector members 10 and 12 are mounted at spaced locations on a collapsible mandrel (not shown). An end of the wire forming the wire helix is then affixed to one of the connectors e.g., the female connector member 12, and is helically wound around a length of the connector, along the length of the mandrel (not shown) and around a length of the other connector member, e.g., the male connector member 10. During winding, an adhesive coating is continuously applied all along the length of the wire forming the helix 14. Upon reaching the desired length, the wire is terminated and the free end is affixed to the other connector member, e.g., the male connector member 10.

One or more flexible cordlike tension members 16 are then placed over the wire helix and affixed at their ends to connector members 10 and 12. Preferably, at least a pair of tension members 16 are used and are affixed to the connector members 180° apart so that the reinforcement is parallel to the axis of the helix. A blanket of insulating material is next sprayed with an adhesive that covers a sufficient portion of one surface thereof to provide at least one circumferential wrap around the wire helix. The insulating blanket is then wrapped convolutely or circumferentially around the connectors 10 and 12, the wire helix 14 and the longitudinal reinforcement 16 so that the adhesive-coated surface faces the interior of the duct. Preferably, the insulating blanket covers substantially all of the female connector 12 and only a portion of the male connector 10. After wrapping, the trailing end of the insulating blanket is preferably secured in place by means of staples (not shown). An outer sleeve of flexible fluid-impermeable material is then pulled over the insulating blanket and the mandrel is collapsed to release the finished section of duct.

In the present invention, many different materials can be used to produce the helix element of the duct. However, the helix material should be resistant to atmospheric corrosion, should possess sufficient strength and rigidity to prevent collapse of the duct in a radial direction upon application of moderate pressures, but should not be so strong as to adversely affect the flexibility of the duct. The helix material should also be sufficiently elastic to cause springback of the duct to its original shape as soon as external deforming pressures on the duct are relaxed. The desired helix material should exhibit, then, a balance of good flexibility, elasticity and strength. Any material roughly conforming to the form of a slender rod or wire composed of metal, plastic or a combination thereof, having a circular or noncircular cross section and exhibiting a suitable balance of these characteristics can be used.

Galvanized hard-drawn steel spring wire has been found to be an excellent helix material. For ducts 9 inches or less in inside diameter, a galvanized wire of 0.041 inch in diameter is preferred. For ducts between 10 and 18 inches in inside diameter a wire 0.051 inch in diameter should be used. In all duct sizes, the preferred spacing of the convolutions of the wire helix is three-eighths of an inch from center to center, although the spacing may range from ¼ to 1 inch and still produce a suitable duct.

Figure 2:
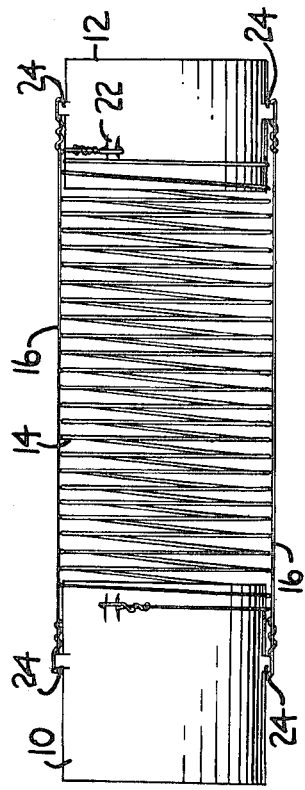
FIG. 2 is a view of one preferred embodiment of the duct of this invention with its insulating material and flexible outer sleeve removed for the sake of clarity.

FIGS. 1 and 2 show the wire helix fastened to metal connectors or couplings 10 and 12. As will be understood, the metal connectors or couplings are used to provide means on the ends of the duct for fixing and stabilizing the ends of the wire helix 14 and the longitudinal reinforcement 16, as well as means for attaching one section of duct to another or to other coupling members. In the embodiment shown, the male connector 10 and the female connector 12 both comprise a galvanized sheet metal sleeve or coupling of cylindrical cross section. For suitable resistance to atmospheric corrosion, the zinc-coated (galvanized) sheet steel and steel wire used in the construction of the duct of this invention preferably has a uniform zinc coating of about 0.3 ounce per square foot of area coated (0.6 ounce per square foot of sheet), as determined by the standard method of test for weight of coating on zinc-coated (galvanized) iron or steel articles, ASTM designation A90-53.

Projecting from the outer surface of each connector, there is shown an open tab or loop 22 that forms an integral part of the connector and is preferably produced by a simple stamping operation, such as by punch-pressing a small portion of the connector material outwardly from the remainder of the connector material. As shown, the ends of the wire helix are inserted through the loops 22 and the wire is then twisted on itself to firmly secure the ends of the wire to the connectors and thereby stabilize the ends of the wire helix.

Figure 3:
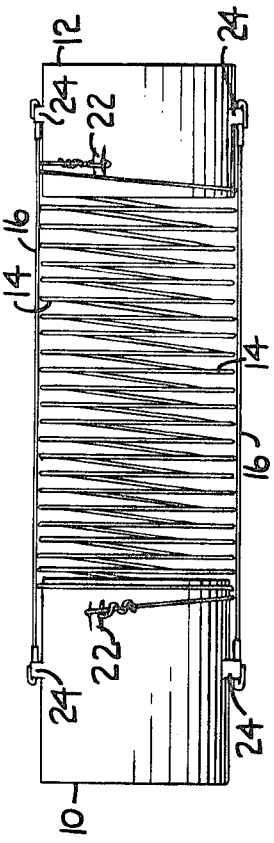
FIG. 3 is a view of a second preferred embodiment of the duct of this invention, also with its insulating material and flexible outer sleeve removed for the sake of clarity.

Also projecting from the outer surface of the connectors are open tabs or loops 24 that provide means for attaching longitudinal reinforcement 16 to the connectors. During manufacture of the duct, these tabs or loops 24 are longitudinally aligned on the mandrel so that the reinforcement 16 is subsequently attached to the connectors parallel to the axis of the duct. Shown in FIGS. 1 to 3 are two longitudinal reinforcement members 16. For this purpose, as best shown in FIGS. 2 and 3, a pair of tabs or loops 24 spaced 180° apart are provided on each of the connectors.

One preferred longitudinal reinforcement 16, that is usable with all duct sizes, is galvanized steel wire of 0.041 inch diameter. As shown in FIGS. 1 and 2, the ends of the wire reinforcement 16 are inserted through the loops 24 and the wire is then twisted on itself to firmly secure the ends of the wire to the connectors, thereby longitudinally reinforcing the wire helix-connector complex against tensile forces tending to separate the connectors and straighten the wire forming the helix 14.

Illustrated in FIG. 3 is an alternative arrangement to that shown in FIGS. 1 and 2. Here, in lieu of a steel wire, the preferred longitudinal reinforcement 16 is a nominal one-eighth inch fiber glass cord terminated with aluminum tubing or sleeves 26. In the embodiment shown, the sleeves 26 are about 2 inches in length and are compressed or flattened to firmly secure the sleeves around the ends of the cord. The sleeves are then inserted through loops 24 on connector members 10 and 12 and bent into a hook shape to clinch the sleeves around loops 24, thereby securing the cord reinforcement to the connector members.

With respect to each of the above preferred embodiments of flexible cordlike tension members, the particular wire and wire size, as well as the particular cord material, cord size and cord attachment means selected, were each chosen with a view towards maintaining the flexibility of the duct, i.e., its bendability and twistability, while providing the duct with sufficient longitudinal strength to withstand at least a 50 pound axial tensile load for 24 hours. Moreover, the materials used in the preferred tension members of this invention were each chosen because they were resistant to atmospheric corrosion. Also, these materials were used only in combinations that would not cause any detrimental galvanic action which would adversely affect any part of the system formed from such materials.

Absent a need for fulfilling the foregoing criteria, many materials and combinations of materials may be used within the contemplation of this invention to provide flexible cordlike tension means to enhance the axial tensile strength of flexible duct while maintaining its flexibility. Moreover, as will be apparent, many equivalent means of attachment other than those specifically mentioned may be used in the practice of this invention.

In accordance with the present invention, the adhesive applied to the wire helix and sprayed on the blanket prior to fabrication to bond the helix and connector members to the insulating blanket may be any conventionally used adhesive, although a nonflammable type is preferred for safety considerations. Nonflammable adhesives are preferred also because they are frequently required by local building codes and ordinances. The adhesive used should remain flexible, even after setting, so that the duct may be flexed without permanently damaging the bond, as may occur during installation of the duct. The adhesive used should also have a composition which does not attack or corrode the strand-fiber composite material of the insulation blanket.

The preferred adhesive is a neoprene elastomer and resin adhesive. Other suitable adhesives that may be used are fully disclosed in the aforementioned application, Ser. No. 701,301. Also, as disclosed in said application, the same adhesive may be used on the blanket material as that applied to the wire helix. The only modification made is that the adhesive is thinned somewhat so that it may be easily sprayed on the blanket composite.

The insulating material preferably employed in the improved duct of the present invention is a composite of individual glass fibers and glass fiber strands bonded together by a thermosetting resinous binder, and in which each component is randomly oriented and uniformly distributed throughout the other. This insulating material and its method of manufacture are fully disclosed in the aforesaid copending application, Ser. No. 701,301 the disclosure of which is incorporated herein by reference.

The wire helix, since it is dimensionally unstable in the longitudinal direction, must be firmly bonded to the insulating blanket to maintain the spacing between convolutions. Furthermore, the bond between the wire helix and the insulating blanket must be sufficiently strong to permit flexing and unflexing of the duct without collapse or without decreasing the internal cross-sectional area of the duct, to avoid restricting fluid flow. The strand-fiber composite blanket material mentioned above develops the required strength in the duct because of its superior ability to adhere its mass to the helical wire element of the duct while at the same time maintaining a strong internal bond between the various components of the blanket material.

The flexible sleeve material employed with this invention can comprise any flexible substantially nonexpandable material such as polyvinyl chloride. The preferred sleeve material of the present invention is a 3.0 — 3.35 mil thick extruded polyvinyl chloride tubing. Other materials, such as a polyvinylene chloride film, a laminated polyvinyl chloride film and fiber glass scrim fabric material and various neoprene-impregnated glass cloths may also be used.

As will be apparent from FIG. 1, it is desirable that the finished duct section have the insulating material and flexible sleeve essentially completely covering the female connector 12 and only partly covering the male connector 10, so that when joined with other duct sections or the like, there is provided an essentially continuous cylindrical covering of insulating material and sleeve material about the duct. Additionally, the flexible sleeve material 20 may be somewhat longer than the insulating material 18, and the extra length of material (not shown) may be folded back on itself at one end of the duct section, so that by unfolding this extra length there is provided an overlap of sleeve material 20 at each joint between adjacent duct sections. This lap joint of sleeve material is preferably taped to enhance the desired fluid and vapor impermeability of flexible duct construction.

To demonstrate the increased tensile strength properties of ducts fabricated in accordance with the present invention over that exhibited by similarly constructed ducts fabricated without longitudinal reinforcement, various samples of each type of duct were subjected to the Underwriters' Laboratories, Incorporated, standard tension test. The details and procedures of the test, as briefly reproduced hereinbelow, are given in "Standards for Safety," Air Ducts, second edition, UL 181- 1967 on page 22.

TENSION TEST

Sections of flexible duct and the joint between sections, and connectors, shall, when tested in accordance with these requirements, resist damage when subjected to a 50 pound pull for 24 hours.

Samples previously untested are to be used for test.

Samples 8 feet long are to be made up to provide for a circumferential joint at the center of the sample. In making up a sample of flexible duct, the material is to be extended to its normal length. If the joint is reinforced to the extent that the section may be less vulnerable to the test than a section without the joint, additional samples of sections without the joint are to be tested; except that if the longest section obtainable from the material under test is less than 8 feet, additional pieces are to be joined thereto to provide a sample 8 feet long, in which case the longest piece is to be in the middle of the test section. Any adhesive or cements are to be allowed to cure for a period of at least 24 hours. Samples are not to have been exposed to relative humidity greater than 70 percent during the 24 hour period prior to the test.

Suitable steel collars, if not part of the assembly, are to be attached to each end of the test sample in accordance with the manufacturer's instructions. One end collar is then to be secured to an overhead support so as to allow the sample to be suspended vertically. A 50 pound weight is to be attached to the lower end collar and allowed to remain for 24 hours.

Observations are to be made during and following the application of the test load. The sample is not to rupture, collapse, or separate; any joining material is to remain intact; and there is to be no evidence of other damage to the sample which would cause it to be unusable.

Flexible duct samples prepared in accordance with FIGS. 1 through 3 of the present invention and tested in accordance with the foregoing test requirements exhibited superior tension characteristics by consistently meeting and exceeding the UL 181- 1967 tension test. On the other hand, similarly prepared flexible duct samples, without any longitudinal reinforcement, consistently failed to pass the UL 181- 1967 tension test.

In addition to the above, flexible duct samples prepared in accordance with this invention were compared to similar flexible duct samples using fiber glass scrim cloth and prepared in accordance with U.S. Pat. No 3,394,737 . Manual manipulation of these samples conclusively established that the flexibility of the duct, i.e., its bendability and twistability, was seriously impaired when scrim cloth was used, whereas no effect on bendability and twistability was noted in connection with duct produced in accordance with FIGS. 1 through 3 of this invention. This difference is believed to be due to the scrim cloth preventing the helical windings from acting independently of each other when the duct is subjected to a bending or twisting action, whereas the flexible cordlike tension members of this invention provide little, if any, restriction to bending or twisting of the wire helix.

It will be apparent from the foregoing that, in addition to improved tensile strength, the duct of the present invention also retains the desired flexiblity, ease of installation, good air flow characteristics, competitive price and desirable acoustical characteristics of the earlier flexible duct designs that did not utilize longitudinal reinforcement.

While the preferred embodiments of this invention have been illustrated and described, it will be understood that various changes and modifications may be made within the scope of the appended claims without departing from the spirit of the invention. For example, the desired longitudinal reinforcement could be incorporated with the insulating blanket material and, either during or after wrapping the blanket about the wire helix, the ends of the reinforcement could be suitably affixed to the connector members. As thus viewed, the longitudinal reinforcement could comprise lengths of cord, strand, yarn, wire or the like that are either embedded in the blanket of insulating material or affixed to one surface thereof so as to extend longitudinally from one connector member to the other. For the above purpose, as well as in connection with the constructions heretofore described, use of a weftless warp of reinforcing tension members or cordlike members, such as disclosed in copending application, Ser. No. 523,182 would be particularly useful in the furtherance of the objects of the present invention.

We claim:

1. A flexible insulated duct comprising a wire helix secured at each end to a longitudinally reinforced connector member, wrapped with glass fibrous insulating material and encased in a flexible fluid-impermeable sleeve, said longitudinal reinforcement consisting of flexible cordlike tension means affixed to said connector members to enhance the axial tensile strength of the duct while maintaining its bendability and twistability.

2. The flexible insulated duct of claim 1 wherein said flexible cordlike tension means comprises at least a pair of metal wires disposed at spaced locations about the periphery of said wire helix so that said metal wires are substantially parallel to the axis of the duct.

3. The flexible insulated duct of claim 2 wherein said wires are composed of galvanized steel wire having a uniform zinc coating of 0.3 ounce per square foot of surface area coated.

4. The flexible insulated duct of claim 1 wherein said flexible cordlike tension means comprises at least a pair of fiber glass cords spaced approximately 180° apart so that said fiber glass cords are substantially parallel to the axis of the duct.

5. A flexible insulated duct comprising a continuous wire helix, a connector member secured to each end of said wire helix, longitudinal reinforcement consisting of flexible cordlike tension means affixed to said connector members to enhance the axial tensile strength of the duct, a coherent, strand-individual fiber insulating material wrapped about said helix, means for affixing the insulating material to said wire helix and a flexible sleeve disposed about said insulating material and said helix.

6. The flexible insulated duct of claim 5 wherein said insulating material extends past said wire helix to essentially completely cover the outer surface of one of said connector members and to partially cover the outer surface of the other of said connector members.

7. The flexible insulated duct of claim 6 wherein the strand-individual fiber composite insulating material is fabricated from fiber glass and the means for affixing the wire helix to the insulating material comprises a nonflammable adhesive.

8. The flexible insulated duct of claim 7 wherein said flexible cordlike tension means comprises at least a pair of metal wires spaced approximately 180° apart so that said metal wires are substantially parallel to the axis of the duct.

9. The flexible insulated duct of claim 7 wherein said flexible cordlike tension means comprises at least a pair of fiber glass cords spaced approximately 180° apart so that said fiber glass cords are substantially parallel to the axis of the duct.

10. A flexible insulated duct comprising a continuous wire helix, a connector member secured to each end of said wire helix, longitudinal reinforcement consisting of flexible cordlike tension means affixed to said connector members to enhance the axial tensile strength of the duct, a coherent, strand-individual fiber, glass fibrous insulating material wrapped about said helix and extending past said helix to essentially completely cover the outer surface of one of said connector members and to partially cover the outer surface of the other of said connector members, adhesive means for affixing the helix to adjacent strands of the insulating material and for affixing the insulating material to the connector members to add to the strength and integrity of the duct, and a flexible, fluid-impermeable sleeve disposed about said insulating material, said helix and said connector members.